United States Patent [19]

Kuechler

[11] 4,085,736
[45] Apr. 25, 1978

[54] GREASE-HOOD APPARATUS

[75] Inventor: Irvin R. Kuechler, San Bernardino, Calif.

[73] Assignee: Vent-Cair, Inc., San Bernardino, Calif.

[21] Appl. No.: 618,831

[22] Filed: Oct. 1, 1975

[51] Int. Cl.² .............................................. F24C 15/20
[52] U.S. Cl. .......................... 126/299 D; 55/DIG. 36
[58] Field of Search .................. 98/115 R, 115 K; 126/299 R, 299 B; 55/DIG. 36, 439, 467, 459 R, 459 A, 459 B, 459 C, 459 D

[56] References Cited

U.S. PATENT DOCUMENTS

| 926,206 | 6/1909 | Morse | 55/459 |
| 3,664,255 | 5/1972 | Keuchler | 98/115 K |

Primary Examiner—Ronald C. Capossela
Attorney, Agent, or Firm—Richard L. Gausewitz

[57] ABSTRACT

The grease hood has a small dimension in the front-to-rear direction, and encloses a relatively large vortex the maximum vertical dimension of which is about equal to or greater than the maximum horizontal dimension thereof. The maximum diametral dimension of the vortex in a direction generally perpendicular to the grease-filter means is about equal to or less than the maximum diametral vortex dimension in a direction generally parallel thereto. In one illustrated embodiment, the vortex is generally circular, whereas in a second illustrated embodiment the vortex is generally elliptical and vertically elongated.

The grease-filter means in one illustrated embodiment is not planar but instead is curved, the curvature cooperating with the curvature of the vortex liner to permit achievement of benefits including relatively small size of the grease hood. More specifically, the curved filter is associated with the vortex liner of generally circular shape in such one embodiment.

The preferred filter means are of novel construction for maximized filtering efficiency, and are adapted to be associated with electrostatic means to provide combination electrostatic and centrifugal-impingement filtering action. The cross-sectional shape of the filter means is such that the air and fumes first flow rapidly, then slow down and reverse direction, then speed up again, and then slow down and again reverse direction.

Both the front panel and the vortex liner are adapted to open in order to permit removal of the filters in an easy manner for cleaning or other purposes. Thus, the front panel opens, and the vortex liner is movable away from its normal operating position, in order that straight, simple access to the filters may be achieved.

Because the hood has the small dimension in the front-to-rear direction, it may be mounted at a very low elevation above only the rear portion of a cooking appliance disposed therebeneath. Furthermore, it may be introduced into the kitchen through a relatively small opening in the ceiling or roof.

16 Claims, 10 Drawing Figures

GREASE-HOOD APPARATUS

BACKGROUND OF THE INVENTION

1. Field of the Invention

This invention relates to the field of grease-hood and grease-filter apparatus, particularly for use in restaurants.

2. Description of Prior Art

For a great number of years, food was cooked in and around fireplaces, stoves, etc., and the smoke was allowed to pass up the chimney by pure convective action. However, smoke often escaped to the room causing deposition of grease on various surfaces of the wall, ceiling, etc. Furthermore, there was much grease and charred material collected in the chimney, a potent fire hazard.

In relatively modern times, it was determined that the public welfare would be improved by requiring restaurants to install suction fans which would draw large volumes of air up the chimney. The idea was to get the smoke and grease up the chimney so fast, and throw it out into the air so far, that it would not cause trouble. These systems were failures, for many reasons, including: (a) the grease collected in and around the chimney, on the roof, etc., with consequent fire and sanitation problems, (b) large amounts of heated or air-conditioned air were drawn from the restaurant and passed up the chimney, with consequent extreme wastage of fuel and also with much discomfort (caused by strong drafts) to the patrons and cooks in the restaurant, (c) the smoke sometimes bounced back in the cook's face, despite the strong drafts, creating discomfort to him or her, and (d) the food on the stove was cooled excessively by the rapid air flow.

The next step in the evolutionary process was to provide grease filters (in addition to the high-volume forced-air flows) relatively close to the cooking space. These also were failures because they did (unless prohibitively expensive and complicated) a poor job of filtering — so that grease still lined the chimney and collected on the roof. There was therefore a distinct problem whereby the chimney required cleaning (often by independent service companies) several times per year. The filters not only did an adequate job of filtering, but they tended to increase the problem of smoke bouncing or billowing back into the cook's face.

The above problems were solved by the advent of convective-flow and vortex apparatus described in U.S. Pat. No. 3,664,255 and in Pat. No. 3,952,640 and U.S. Pat. No. 3,943,836, (which apparatus, except for some forms of said U.S. Pat. No. 3,952,640, have been on the market more than one year prior to the filing date of the present application). However, such vortex apparatus has to date only been employed in hoods of the canopy type, wherein the bottom of the hood is spaced so high above the floor that the cook may walk beneath it without bumping his head. The front of the canopy hood overhangs much of the area where the cook stands.

In the canopy structures illustrated in the above-cited patent and patent applications, the maximum horizontal dimension of the vortex was large in comparison to the maximum vertical dimension thereof. Furthermore, the maximum diametral vortex dimension generally perpendicular to the grease-filter means was large in comparison to the maximum diametral vortex dimension in a direction generally parallel thereto.

Canopy hoods (such as those illustrated in the cited patent and patent applications) have been and will continue to be important factors in many restaurants, particularly larger conventional restaurants, but there are many fast-food restaurants and other restaurants wherein the size and expense of the large canopy hoods are not desired. For such restaurants, it is greatly desired that the hoods be sufficiently small that they may be mounted over only the rear portion of the cooking appliance, at a low elevation below that of the head of the cook. Thus, for such last-mentioned types of restaurants, it is extremely important that the front-to-rear dimension of the hood be small, permitting the cook to see the entire cooking surface and to reach the portion thereof without bumping his head on the grease-hood apparatus. It is also important that such hoods be aesthetically satisfactory, and do not have exposed interiors presenting black, sooty aspects to the patrons in the restaurants.

Hood systems of the non-canopy type, and wherein one or more blowers were incorporated, have (insofar as applicant is aware) involved the sucking or blowing (as distinguished from convecting) of large amounts of air at regions far below the hoods. (For example, Jensen U.S. Pat. No. 3,400,649 brings supply air down to the back of the cooking appliance, then blows and sucks it up through the filters, the forced-flow upwardly-directed air being stated to create a venturi effect which draws room air back over the cooking surface.) In numerous other prior-art apparatus, there is an extremely great suction effect whereby room air is sucked in great volumes up the chimney, instead of being substantially balanced by inlet air from a region exterior to the room. Such last-mentioned type of prior-art apparatus is extremely undesirable for numerous reasons including energy wastage, creation of uncomfortable drafts for the customers and cooks, etc.

SUMMARY OF THE INVENTION

The present vortex-type grease hood may be made sufficiently shallow that the underlying cooking surface projects outwardly from beneath the front portion thereof, and may be mounted sufficiently low that the bottom end thereof is well below the elevation of the cook's head. The shallowness (small front-to-rear dimension) of the hood permits the cook to bend forward at the waist, without bumping his head, in order that he may reach the food on the rear portions of the cooking surface. Such shallowness furthermore permits the cook to easily see all portions of the cooking surface. The interior of the hood is not exposed to view.

The forced-flow vortex enclosed within the present grease-hood apparatus has a maximum vertical dimension about equal to or greater than the maximum horizontal dimension thereof, permitting very effective vortexing and energy dissipation in a shallow space. The maximum diametral dimension of the vortex in a direction generally perpendicular to the grease-filter means is about equal to or less than the maximum diametral dimension of the vortex which is generally parallel to the grease-filter means. The vortex is generally vertically elongated or generally circular, and is such that even sudden large upward billows of expanding fumes (caused, for example, when steaks are turned over) are not permitted to escape to the room but instead are cooled and passed to the filters for exhaust therethrough.

The invention further comprises in one of its forms a curved grease-filter means and associated curved vortex liner, such two curved elements cooperating with each other to permit achievement of efficient vortexing in a small space.

The grease-filter means incorporated in the present apparatus effect combination impingement and centrifugal grease-separation actions, and in one embodiment are effectively combined with simple and economical means for achieving electrostatic precipitation for additional filtration. The filters comprise two rows of alternated generally tubular elements the adjacent sides of which are open and incorporate intermeshed flanges. The two rows are staggered or offset so that the filters in one row alternate with the filters in the other row. In the electrostatic-precipitator embodiment, electrically-conductive rods or wires are provided axially of such tubular elements.

To permit mounting, removal and cleaning of the filter elements, the present invention further provides access means not only through the front of the housing of the grease-hood apparatus but also provides for movement of the vortex liner itself. Particularly when the hood is of the low-level type disposed above the rear of the cooking appliance, such combined access means permit the operator to reach the filters without the need for a ladder (only a stool, if anything, being required). Such extremely simple access to the filters is a major benefit in comparison to the prior art, particularly since restaurant employees are frequently reluctant to expend major amounts of energy in checking and cleaning filters.

DETAILED DESCRIPTION OF THE PREFERRED EMBODIMENTS

Throughout the present specification and claims, the words "stove" and "cooking appliance" denote any kind of a device adapted to cook food. Thus, they include stoves, grills, charbroilers, French fryers, etc. The words "cooking surface" apply to the upper regions of any such cooking appliance, whether or not there is actually any "surface" present (there being, for example, no such surface at the upper region of a usual French fryer). Normally, the cooking surface is the horizontal surface of a grill, etc.

EMBODIMENT OF FIGS. 1–3

Figure 1:
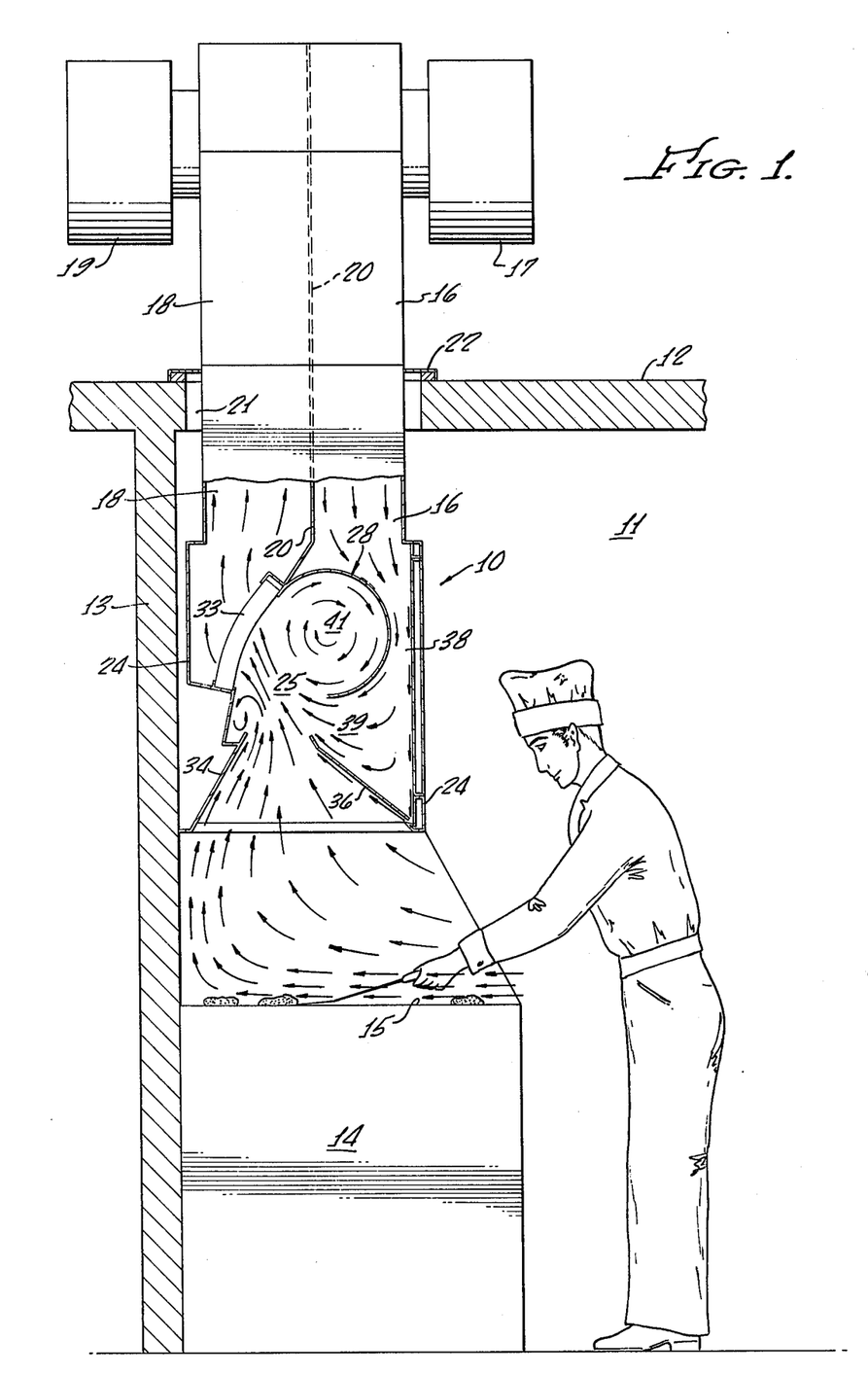
FIG. 1 is a vertical view, partially in side elevation and partially in vertical section, showing the present grease-hood system in actual operation.
Figure 2:
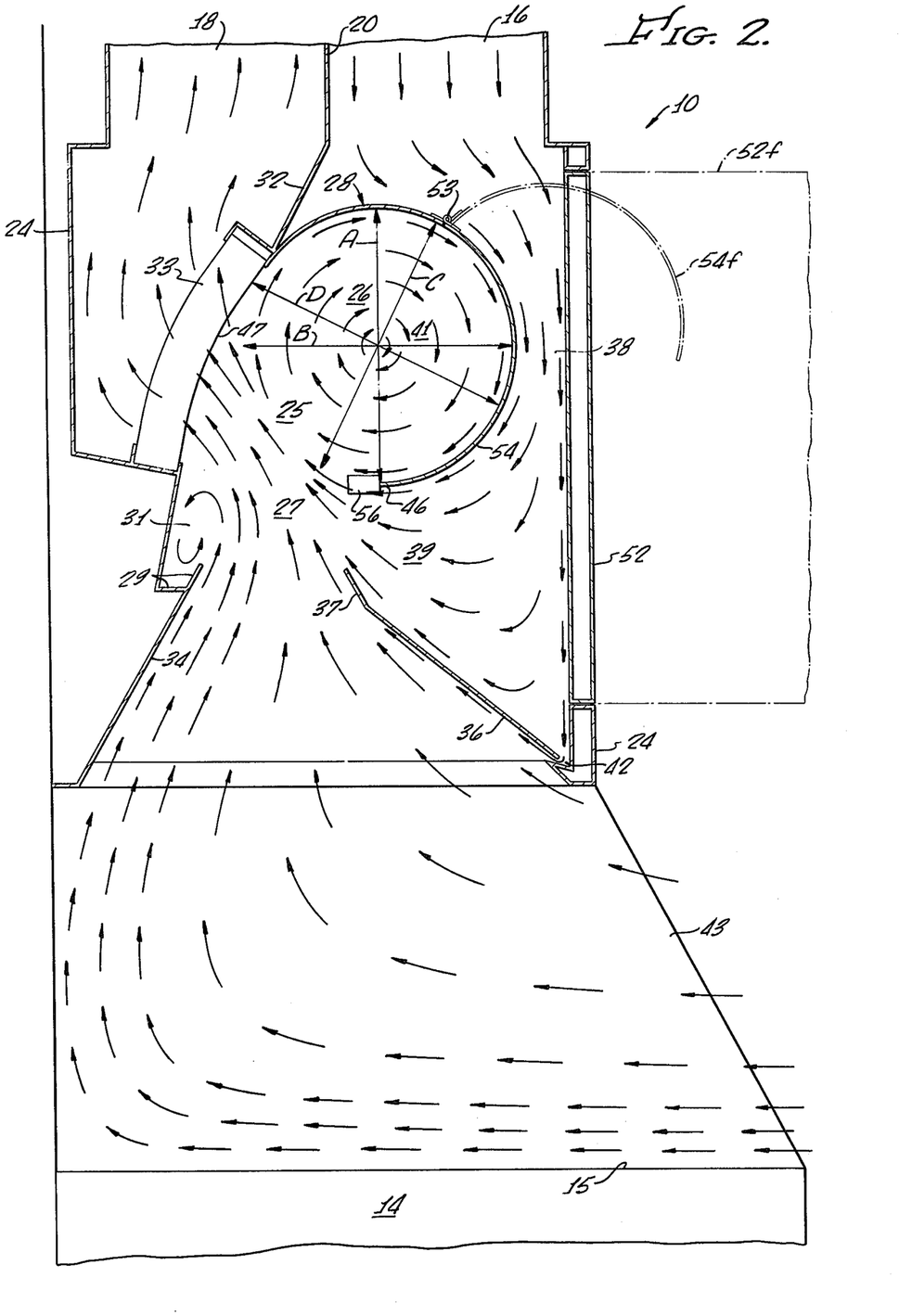
FIG. 2 is an enlarged vertical sectional view of the central region of FIG. 1, showing the flow patterns for air and fumes and showing in phantom lines the means for access to the filters in order to permit changing or cleaning of the same.
Figure 3:
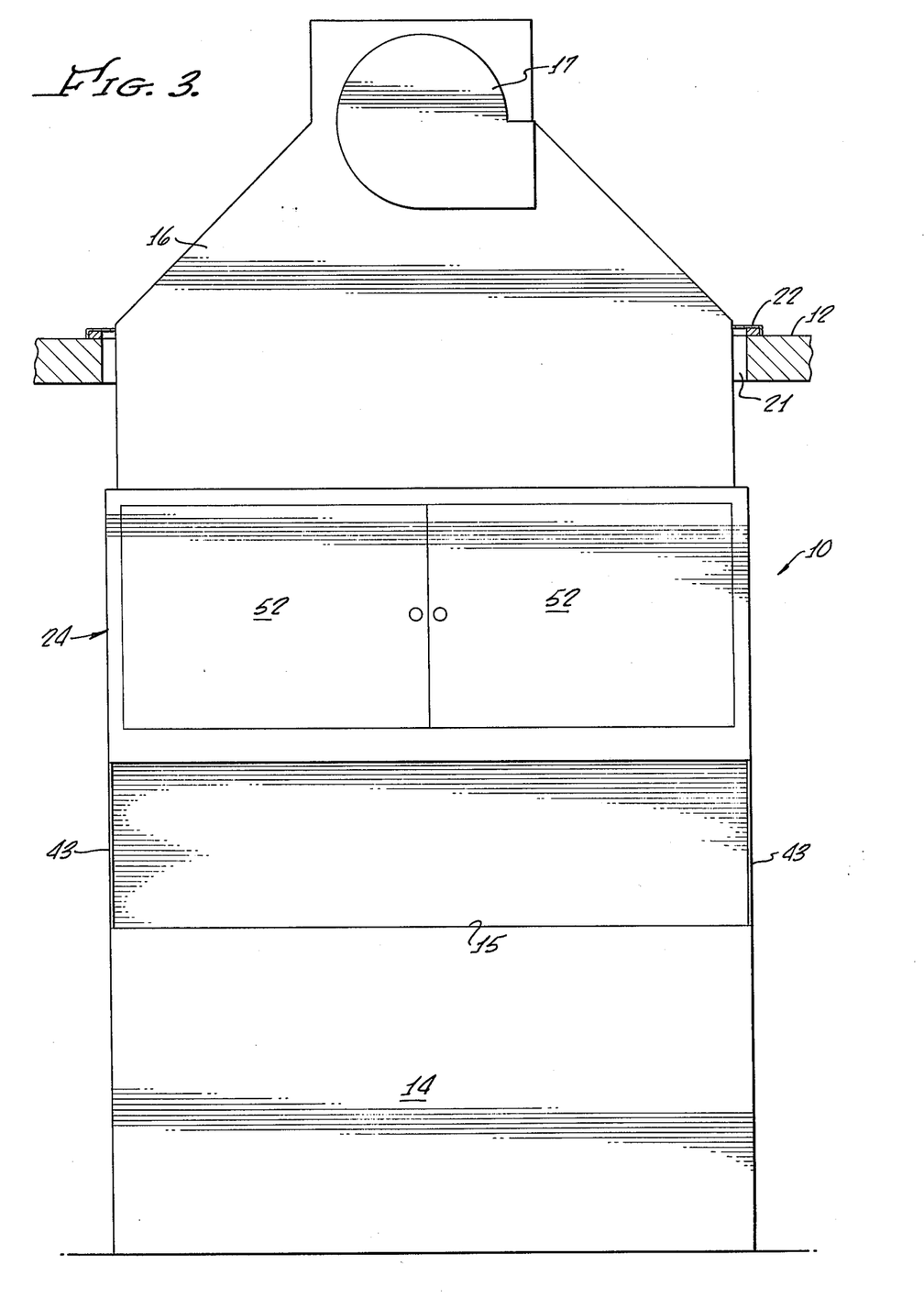
FIG. 3 is a front elevational view, as viewed from the right in FIG. 1.

The apparatus of the embodiment of FIGS. 1–3 comprises a grease hood 10 which is supported in a room 11 having a roof or ceiling 12 and a vertical side wall 13. It is to be understood that the room 11 need not incorporate the vertical wall 13, in which case corresponding wall means is preferably provided in association with the present grease hood 10. Supported on the floor of the room 11 is a cooking appliance 14 having at the upper side thereof a cooking surface 15.

As described in copending patent application Ser. No. filed on even date herewith by the same inventor, entitled Combination Forced-Flow and Convective-Flow Grease-Hood System and Method Having a Low-Level Entry Portion over a Protruding Cooking Appliance, it is important — to satisfy the desires of numerous restaurant-owning customers — that the lower end of the grease-hood system be at a low elevation, well below the elevation of the head of a normal-stature adult male cook in standing position. It is also important that the forward portion of the cooking surface 15 extend or protrude outwardly (toward the cook) much further than do the lower end and lower portion of the grease-hood system. The protrusion of the cooking surface from beneath the hood is important (in systems wherein the lower end of the smoke hood is below the cook's head) in order to maximize the size of the cooking surface, to permit the cook to see all portions of the cooking surface and also to reach all portions thereof. The above-cited copending application filed on even date herewith is hereby incorporated by reference herein as though set forth in full.

The grease-hood system comprises, in addition to the grease hood 10 itself, an inlet plenum 16 which is supplied by an inlet blower 17 and delivers supply or make-up air to the hood 10 from a region exterior to room 11. The system further comprises an outlet or exhaust plenum 18 through which air and fumes are drawn by an exhaust blower 19 and thus discharged to the exterior of room 11. The illustrated inlet and exhaust plenums 16 and 18 have a common dividing or partition wall 20 in the illustrated embodiment, and both are of the extended type described in said copending U.S. Pat. No. 3,952,640, for Apparatus and Method for Extracting Grease and Smoke, and Method of Installing the Same.

The hood 10 and the lower portions of plenums 16 and 18 are lowered into room 11 through an opening 21 in roof 12, as described in U.S. Pat. No. 4,056,877, filed for Apparatus for Extracting Grease and Smoke, and Method and Apparatus for Installing the Same. Sealing means in the form of a plate or flashing 22, etc., are provided over and around opening 21 to prevent ingress of rain, etc., into room 11. The sealing means or flashing 22 are, in the illustrated embodiment, also the primary means for supporting the grease hood 10 so that its lower end is at a predetermined distance above the cooking surface 15 as illustrated.

It is to be understood that other support means may be provided, that the inlet and exhaust blowers 17 and 19 may be a single blower, that recirculation of exhaust fumes from exhaust plenum 18 to inlet plenum 16 may be effected, etc. One or both of the blowers 17 and 19

(or a single blower if one is employed) may be incorporated in the plenums themselves. In the event of recirculation of fumes from exhaust plenum 18 to inlet plenum 16, the recirculating fumes are still exterior to the room 11 since they do not comingle to any substantial extent with the air in the room. This is to be contrasted with numerous prior-art systems wherein room air (greatly in excess of that required by the convection created by the hot cooking surface 15) is sucked from the room up the chimney with consequent great wastage of energy, creation of drafts, etc.

In the present grease-hood system, as in the systems by the same inventor described in the above-cited patent and patent applications, the upward flow of air and fumes into the grease hood 10 is substantially entirely the result of convection. Thus, little or no more air flows outwardly from room 11 than would be the case if there were no blower means at all. In a typical installation, approximately 10 percent of the air and other gases which flow outwardly through the exhaust plenum 18 and blower 19 come from the room 11, and the remaining approximately 90 percent come from the inlet blower 17 and plenum 16.

In accordance with one major aspect of the present apparatus, the grease hood 10 has a small front-to-rear dimension, substantially smaller than that of the cooking surface 15, in order that the cook may readily see and reach all portions of the cooking surface and will not bump his head on the apparatus 10 when he bends forward. Such small front-to-rear dimension of the grease hood 10 permits the opening 21 in ceiling 12 to be relatively small, eliminates the need for a chimney means beneath the grease hood 10 unless there is a requirement for a plate (warming) shelf or pass-through to an adjacent room, minimizes fabrication and shipping weight and costs, facilitates mounting and removal of the filter means as described subsequently, etc. In the following paragraphs, there will first be given a general summary of the operation of the grease hood 10, followed by detailed descriptions of two embodiments which permit achievement of the small front-to-rear dimension.

Referring to FIGS. 1 and 2 in particular, the grease-hood 10 has a generally rectangular housing 24 which defines an open bottomed capture and entrainment chamber 25. Chamber 25 has an upper or vortex portion 26 and a lower or air-curtain portion 27. A vortex liner 28, of predetermined shape and construction as described in detail below, is mounted in housing 24 and it defines the vortex within vortex portion 26. Shelf (ledge) or deflector means 29 are provided below the air-curtain portion 27 and deflect upwardly the make-up air and fumes which pass downwardly thereto, there being a relatively small-size lower vortex 31 (in comparison with the size of the vortex in portion 26) in and adjacent such shelf or deflector means 29.

The common divider 20 of the exhaust and inlet plenums bends rearwardly at 32 and joins the vortex liner 28 adjacent the upper portion of grease-filter means 33 which are described in detail below relative to FIG. 10 and also FIGS. 5–9. The grease-filter means may also be of the type described in detail in U.S. Pat. No. 3,566,585, issued Mar. 2, 1971, except such grease-filter means are (in the embodiment of the present FIGS. 1-3) bent in a predetermined shape as described below.

Disposed beneath the shelf or deflector means 29 is an upwardly and forwardly inclined deflector plate 34, whereas a second plate (the baffle plate) 36 is disposed beneath the forward portion of vortex liner 28. The plate 36, which inclines upwardly and rearwardly, has a bent lip 37 on the upper-inner edge thereof.

In the general operation of the apparatus as thus far described, air from inlet blower 17 and plenum 16 passes downwardly to a vertical throat 38 defined between the vortex liner 28 and the front wall of housing 24. The vast majority of such air then curves horizontally and upwardly, between the plate 36 and the lower portion of vortex liner 28, through a generally horizontal throat 39. From such throat, the inlet (supply or make-up) air emanates in the form of an air curtain and passes through the air-curtain portion 27 (FIG. 2) of chamber 25 toward the grease-filter means 33. Such grease-filter means extend upwardly and forwardly, as shown, and have an an upstream face or surface adjacent chamber 25.

The curtain of air passing through portion 27 of chamber 25 entrains therein the air and cooking fumes which convect upwardly from the cooking surface 15, through the bottom end of the apparatus 10. The convection of air and fumes is, as described in the cited application filed on even date herewith, concentrated adjacent the cooking surface 15 (being indicated by the relatively dense arrows) and provides a rearward fume-sweeping action whereby air is drawn from the room 11, thence passes (together with the fumes) rearwardly over the food cooking on surface 15, thence passes upwardly generally adjacent the vertical wall 13, and thence passes into the chamber portion 25 between plates 34 and 36.

The convected air, the convected fumes, and the force-flow air entering primarily through horizontal throat 39, flow in the curtain toward filter means 33. Some air and fumes pass directly through the filter means to the exhaust plenum 18, but a large portion thereof flows upwardly into the vortex liner 28 for vortical flow therein as the large-diameter upper vortex 41. The air and fumes in the upper vortex 41, and also the air and fumes in the lower vortex 31, eventually pass through the filter means 33 into the exhaust plenum, large amounts of grease being filtered from the air and fumes as they travel through the filters.

A small amount of the inlet or supply air delivered from inlet plenum 16 to vertical throat 38 does not flow through the horizontal throat 39, but instead passes around the foward edge of plate 36, then striking an inclined ledge 42 (FIG. 2) and being deflected upwardly and rearwardly closely adjacent and beneath the plate 36.

The plates 36 and 34, vortex liner 28, grease-filter means 33, etc., extend for all or substantially all of the full width of the apparatus, that is to say, the entire left to right dimension as viewed in FIG. 3. They are held in position by suitable support means.

In order to aid greatly in the convection of air rearwardly and upwardly from the cooking surface 15, and to prevent or minimize the influence of drafts in the room, vertical sidewalls 43 (FIGS. 2 and 3) extend upwardly from the edges of cooking surface 15 to the lower end of the grease hood 10.

THE VORTEX LINER AND FILTER MEANS, EMBODIMENT OF FIGS. 1-3

In accordance with one major aspect of the present invention, the apparatus is such that the large upper vortex 41 has a maximum vertical dimension which is at least about equal to, or greater than, the maximum horizontal dimension thereof. According to another major aspect of the invention, the apparatus is such that the large upper vortex 41 has a maximum diametral dimension, in a direction generally perpendicular to filter means 33, which is about equal to or less than the maximum diametral dimension of such vortex 41 in a direction generally parallel thereto.

With specific reference to FIG 2, the double-arrow "A" is generally vertical, whereas double-arrow "B" is generally horizontal, the points of such arrows delineating generally the outer (maximum-diameter) regions of the large upper vortex 41 which is contained in the vortex chamber 26 defined by liner 28. The double-arrow "C" is generally parallel to the face (upstream side) of filter means 33, whereas double-arrow "D" is generally perpendicular to such face. As before, the points of the arrows "C" and "D" delineate generally the outer regions of upper vortex 41.

It is pointed out that the lengths of all of the arrows "A–D", inclusive, are about equal to each other. This is because, in the embodiment of FIGS. 1–3, the vortex liner 28 is generally circular in vertical section and extends circularly from the upper edge of filter means 33 to a lower lip 46 (FIG. 2) which is spaced upwardly from and generally forwardly of the lip 37 of plate 36. At least about a quadrant of the circle formed by liner 28, adjacent the filter means 33, is open. The lips 46 and 37 define between them the narrowest point of the horizontal throat means 39 from which the air curtain emanates.

The above construction is to be contrasted with the vortex-type hoods specifically illustrated in prior-art patents, etc. In such hoods, the upper vortex had a very large dimension in a direction generally perpendicular to the filter means (as compared to the dimension parallel to the filter means), and also had a very large horizontal dimension (as compared to the vertical dimension). Because of the vortex relationships and dimensions described in the present application, which contrast sharply with the relationships and dimensions specifically shown in the prior art, the front-to-rear dimension of the housing 24 may be small as described above, providing the above-stated (and other) benefits.

To further enhance the vortex action, and to cooperate with the vortex liner 28 in providing the upper vortex 41 having the stated dimensions and relationships, the filter means 33 of the embodiment of FIGS. 1–3 is not planar but instead is curved. The curvature is such that the forward (upstream) face 47 of the filter means 33 extends downwardly to a housing portion above and adjacent the shelf (ledge) or deflector means 29.

The reference to curvature in the previous paragraph does not mean curvature about a vertical axis. Instead, the curvature relates to that of a surface or group of surfaces generated by a generally straight line (hypothetical) which is moved downwardly from the upper-left region of vortex liner 28 to the general vicinity of ledge or shelf means 29. Such line does not move in a plane (as is the case in the prior art) but instead describes a curve, the outline of which is shown, for example, at 47 in FIG. 2. Such curve is generally tangential to, and an extension of, the vortex liner 28 which is preferably generally circularly sectioned (in the present embodiment) as described above. The curve is concave.

VORTEX LINER AND FILTER MEANS, EMBODIMENT OF FIG. 4

Figure 4:
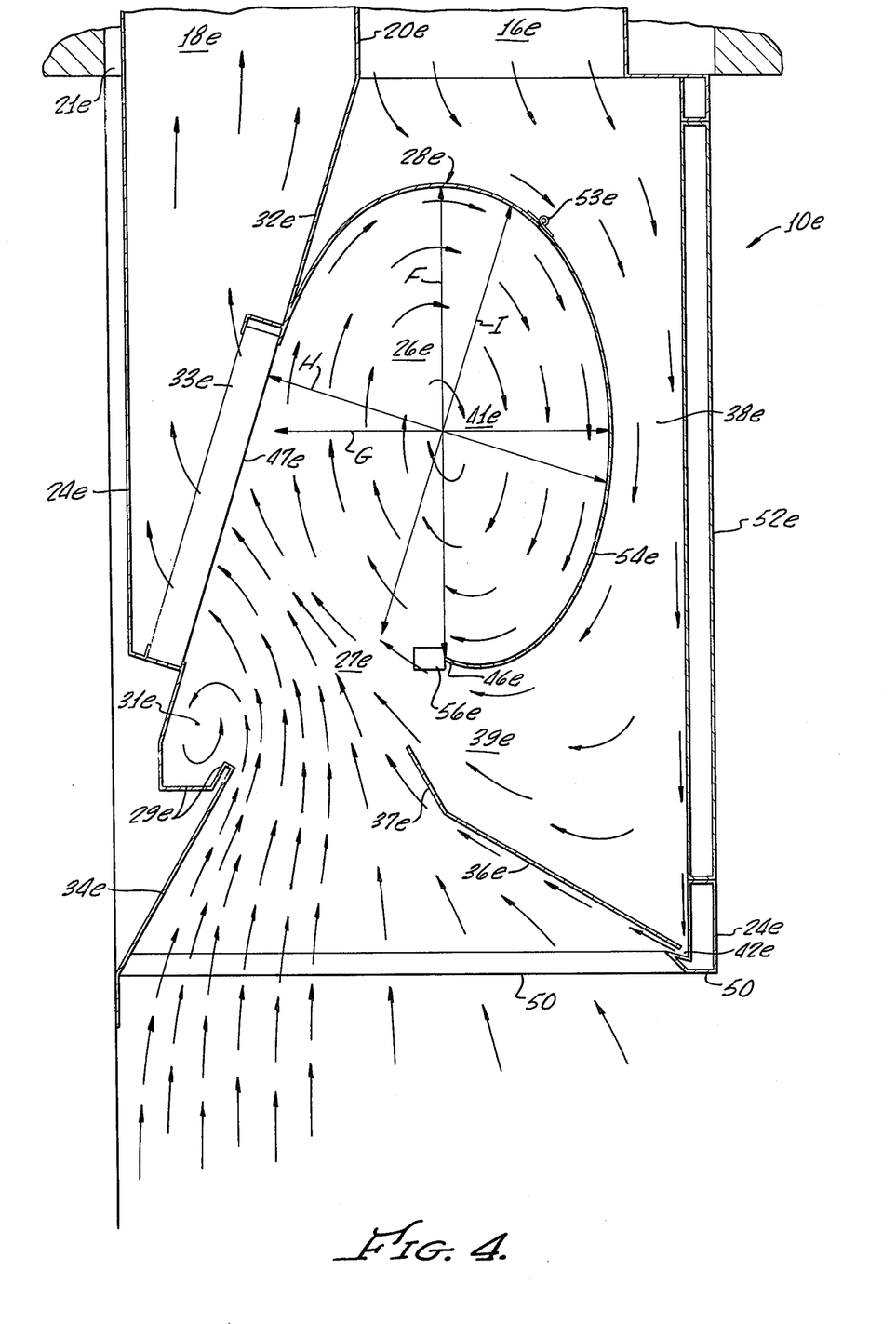
FIG. 4 is a vertical sectional view corresponding to FIG. 2 but showing a second embodiment of the invention.

In the embodiment of FIG. 4, the same reference numerals have generally been employed as in the embodiment of FIGS. 1–3, except that in each case the letter "e" is appended. In the embodiment of FIG. 4, the filter means 33e is shown as being planar instead of curved, having a planar forward (upstream) face 47e. The vortex liner 28e is not generally circularly sectioned as in the embodiment of FIGS. 1–3, but instead is generally vertically elongated as illustrated, being a smooth curve. The upper-left region of vortex liner 28e is generally tangential to the upstream (forward) face 47e of the filter means.

The double-arrow "F" in FIG. 4 shows the maximum vertical dimension of vortex 41e, whereas the double-arrow "G" shows the maximum horizontal dimension thereof. It is pointed out that the vertical dimension "F" is much larger than the horizontal dimension, the shape of the vortex liner 28e being somewhat in the nature of a modified ellipse having a generally vertical major axis. Such ellipse has an open section, at least about equal to a quadrant, relatively adjacent the filter means 33e.

The maximum diametral dimension "H" of the vortex 41e of FIG. 4, in a direction generally perpendicular to face 47e of filter means 33e, is much shorter than is the maximum diametral dimension "I" of such vortex in a direction generally parallel to the face 47e.

The vertical elongation of the vortex liner 28e of the present embodiment produces the maximum action whereby large billows of fumes which pass upwardly into the grease hood from the cooking surface therebeneath are prevented from "bouncing" back downwardly into the room, even under very extreme conditions such as when a large number of steaks are substantially simultaneously turned over on an extremely hot charbroiler. Instead, the fumes whirl (and are cooled) in the large upper vortex and then pass through the grease filter 33e.

It is to be understood that the present grease hood (the embodiments of FIGS. 1–4, inclusive) may be employed not only at the illustrated position, wherein the lower portion of the grease hood is below the head of the cook shown diagrammatically in FIG. 1, but also in certain plate-shelf and/or pass-through embodiments such as are shown in the application filed on even date herewith and cited above. Furthermore, the present vortex dimensions and vortex liner relationships (upper vortex) may also be employed in canopy-type hoods, disposed entirely above the cook's head and extending thereover, in which case the vertically-extended vortex liner 28e (or its equivalent) may in some cases extend through the ceiling 12 and into the space thereabove.

The embodiment of FIGS. 1–4 may also be converted into canopy-type hoods in, for example, the following manner. Let it be assumed that the embodiment of FIG. 4 (for example) is elevated until the lower end 50 is disposed substantially above the elevation of the head of a normal-stature adult male cook standing on the floor adjacent the cooking appliance 14. The apparatus still passes through the ceiling opening 21e of the same size, and has the same small front-to-rear dimension. After the apparatus is thus mounted, a skirt is connected to the lower-right edge thereof as viewed in FIG. 4, and extends downwardly and forwardly over the cook's head, but still spaced sufficiently far thereabove that the cook does not bump his head thereon. Means are then provided to effect upper-rearward flow of air beneath the lower surface of the skirt, in general alignment with plate 36e (FIG. 4), to aid in moving into the capture and entrainment chamber the portions of the cooking fumes which pass upwardly against the skirt instead of directly upwardly between the plates 34e–36e. The skirt may be manufactured at the same time as the hood and may be pivotally or otherwise mounted thereon, and may be pivoted outwardly after the hood is dropped through the small opening 21e.

APPARATUS FOR INSTALLING AND REMOVING THE GREASE FILTERS

In prior-art apparatus, it was conventional to achieve access to the filters through the bottom of the hood. This is particularly inconvenient where the grease hood 10 is mounted at a low elevation as shown (for example) in FIGS. 1 and 2, especially since access is frequently desired when the cooking surface 15 is hot. In accordance with one important aspect of the present apparatus, access to the filters 33 and 33e is obtained through the vortex liners 28 and 28e themselves, not through the spaces between plates 34–34e and 36–36e.

The front side of the housing 24 is provided with doors 52, 52e (embodiments of FIGS. 1–3 and 4). Such doors are, in the present embodiments, hung on vertical hinges (not shown) at the sides of the grease hood 10. Thus, the doors may be swung out at the center by pulling on the knobs shown centrally in FIG. 3, to the open positions shown in phantom lines at 52f (FIG. 2).

Horizontal hinges 53–53e (embodiments of FIGS. 1–3 and 4) are provided in vortex liners 28–28e, preferably somewhat to the right of the vertical center lines thereof. Such hinges permit the right portions 54–54e (FIGS. 2 and 4) of the vortex liners 28–28e to swing outwardly from their operative positions shown in solid lines to the filter-changing positions shown in phantom lines at 54f, FIG. 2. Such right portions 54–54e may be termed door portions.

Suitable means, not shown, are provided to hold the door portions 54–54e in the open positions such as shown at 54f in FIG. 2, thus permitting the operators to readily reach in through the housing and remove, clean and/or replace the filters 33–33e.

Other means are provided to maintain the door portions 54 in their operative positions shown in solid lines. Such last-mentioned means may comprise, for example, the latches indicated at 56–56e. The latches 56–56e are provided on the side walls of the apparatus, that is to say, the extreme right and left portions as shown in FIG. 3, and thus do not interfere substantially with air flow in the grease-hood apparatus. The latches may comprise spring-pressed detents, magnetic latches, etc.

With the described apparatus, the filters 33–33e may be replaced easily in a manner of minutes. The filters are mounted in the apparatus in ways known in the art, for example, by means of upper and lower grooves such as are shown above and below the filter 33e in FIG. 4. The upper groove is sufficiently deep that the filter may be moved upwardly, following which the lower portion is pivoted forwardly out of the lower groove, so that the upper portion of the filter and the entire filter are then readily removed. In all embodiments of the invention, the filters preferably incline upwardly and forwardly, generally as shown.

DETAILED DESCRIPTION OF THE FILTER MEANS

As previously indicated, the filters described in detail in the above-cited U.S. Pat. No. 3,566,585, may be employed both as the filters 33 and 33e, except that in the embodiment of FIGS. 1–3 the filters are curved as described in the present application.

To achieve greater filtering efficiency, and to permit simple and economical incorporation of electrostatic precipitation means when desired (without use of separate electrostatic units), the filter embodiments of FIGS. 7–10 are provided and are preferably employed in the above-described grease-hood apparatus.

Figure 5:
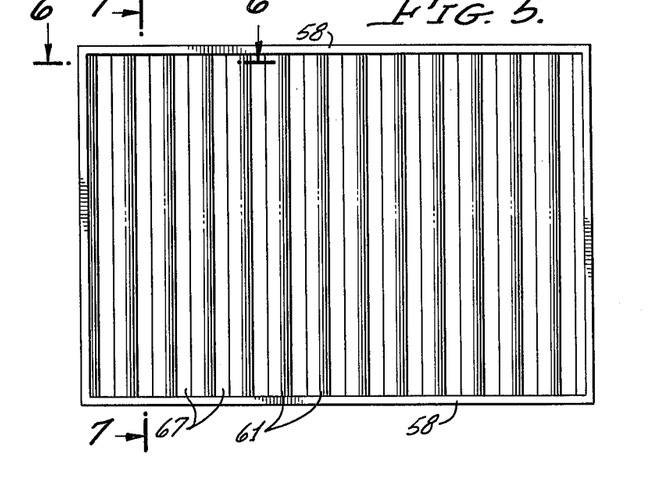
FIG. 5 is a front elevational view of the filter means.
Figure 6:
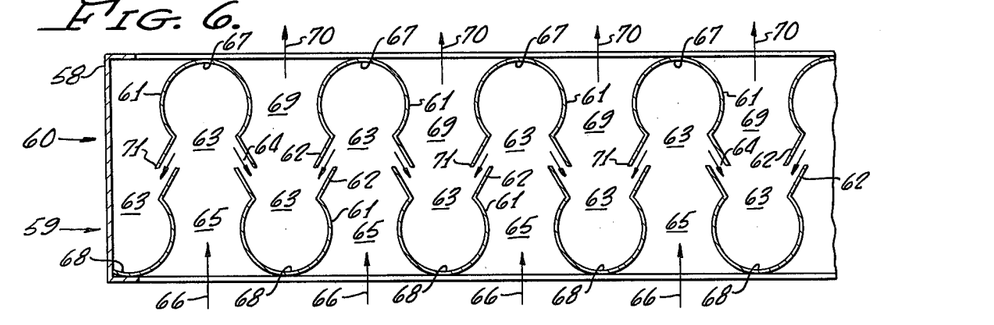
FIG. 6 is an enlarged horizontal sectional view on line 6—6 FIG. 5.
Figure 7:
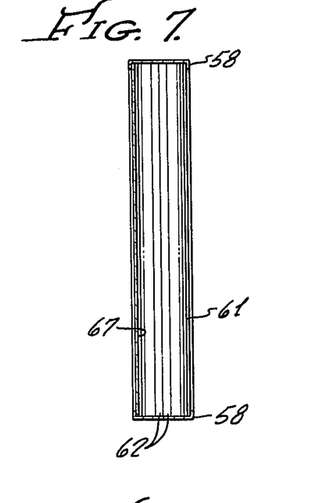
FIG. 7 is a vertical sectional view on line 7—7 of FIG. 5.

Each of the filters of FIGS. 5–7 comprise a rectangular metal frame 58 of channel-shaped configuration, the webs pointing inwardly and being relatively narrow. Mounted in frame 58 are two rows 59 and 60 (FIG. 6) of generally tubular filter elements 61 having overlapped flanges 62 an open sides thereof. The two rows are staggered or offset so that the filters in one row alternate with the filters in the other row.

Stated more definitely, each of the filter elements 61 is shown in FIG. 6 as having a substantially circular cross-sectional shape, comprising substantially more than half of a circle, and as having a longitudinal slot 63 (a gap or interruption in the circle). A flange 62 extends outwardly from the edge on each side of the slot 63 of each filter-element tube 61. The flanges of each filter element diverge away from the center of such element. The amount of divergence of the flanges, and the relative orientations of the filter elements along the rows 59 and 60, are such that throats 64 are defined between one flange 62 of each element 61 in one row and an adjacent flange 62 of the adjacent element 61 in the other row.

In the illustrated form, the filter is so mounted that the row 59 is on the upstream side, adjacent the vortex chamber. Thus, the grease-laden air and fumes from the air curtain and from the vortices first pass into the spaces 65 between adjacent filters 61 in row 59, as indicated by the arrows 66. Such air and fumes then pass through the slots 63 in the filters in second row 60, following which they (or the grease therein) strike the inner rear surfaces 67 of such row 60. The striking of such surfaces 67 causes much of the grease to adhere to such surfaces, by what is known as impingement filtration.

The air and fumes reverse direction in the filters 61 in second row 60 causing centrifugal filtration. They also slow down somewhat, due to the fact that the diameter of each filter 61 is greater than the width of each slot 63. However, such slow-down is continued only briefly since there is then a rapid speed-up of air and fumes as they pass through the throats 64 and through the slots 63 of filters 61 in first row 59. The rapidly flowing air and fumes then strike the interior surfaces of the filters in such first row 59, such surfaces being numbered 68. The air and fumes slow down due to the relatively large diameters of filters 61, again reverse direction, and pass rapidly through the slots 63 in filters 61 in the first row 59, thence through spaces 69 between the filters in the second row 60, and thence into the exhaust plenum as indicated by the arrows 70 in FIG. 6.

There has thus been described very efficient impingement and centrifugal filtration, accompanied by repeated speeding-up and slowing-down of the air and fumes. These actions all contribute to cause a very large proportion of the grease to be deposited on the filter elements 61, particularly on the inner surfaces 67 and 68 thereof, and such grease runs down to the bottom of the filter (by gravity) where it may be collected by suitable means. To enhance such downward movement of the grease, openings may be provided at the lower ends of the filters so that there is somewhat of a downward component of air flow through the tubular portions thereof, thus augmenting the gravity action.

One of the benefits of the described filter means is that there is little or no tendency for grease to be blown around corners (edges) and then passed through the filters instead of clinging to the filter elements. Referring to edges 71, for example, any grease present at the interiors of the adjacent throats 64 would not tend to be blown to the regions indicated by arrows 70, but instead would be blown to the interiors of the filters 61 in first row 59, where it would cling to the interior surfaces 68 by the combination impingement and centrifugal filtration.

In accordance with one aspect of the present filters, and in order to further increase filtering efficiency, electrostatic precipitator means are provided in a simple and economical manner. Such means comprise rods or wires 72 which are mounted axially of the circular portions of each of the elements 61. Because such elements 61a are preferably circular, the rods or wires are spaced equal distances from all regions of the interior surfaces 67 and 68 of such elements, reference being made to FIG. 8. The ends of the rods are insulated, as by ceramic washers 72a, from the frame 58a in which they are mounted.

Figures 8, 9, 10:
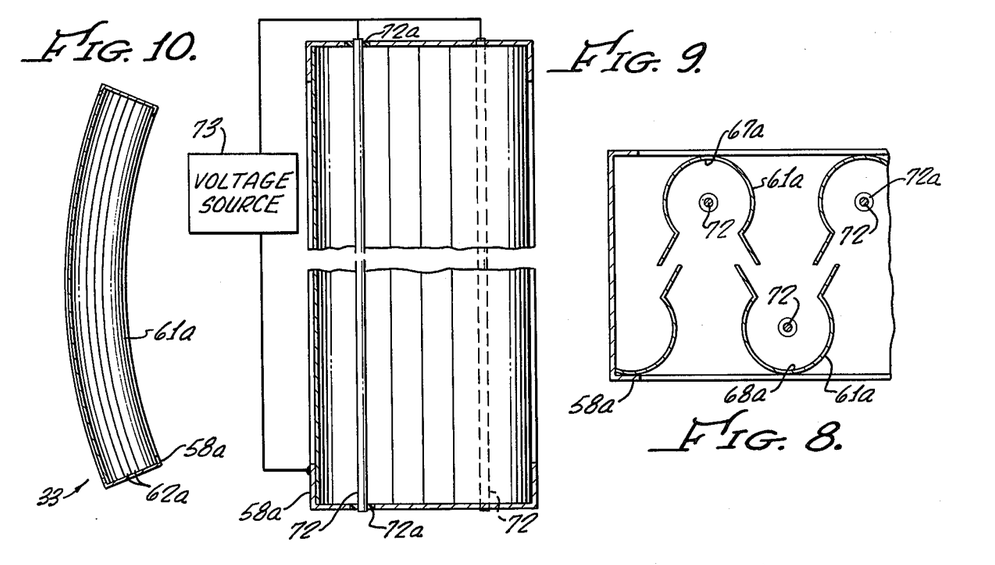
FIG. 8 is a horizontal sectional view corresponding generally to a portion of FIG. 6, but showing electrode rods provided in the generally tubular filter elements.
FIG. 9 is a sectional view illustrating such rods, and illustrating incorporation of the rods in a high-voltage electrical circuit.
FIG. 10 is a view corresponding to FIG. 7 but showing the curved filter.

Referring to FIG. 9, each of the rods is connected to one terminal of a voltage source 73. The frame 58a is connected to the other terminal of such source 73. Furthermore, each of the rods 72 is insulated from the frame 58a by the washers 72a. The source 73 is a high-voltage source which charges rods 72 to one polarity and frame 58a to the opposite polarity, creating an electrostatic action. The frame 58a is in electrical contact with each of the filter elements 61a, so each of such elements 61a is charged correspondingly to the charge on the frame 58a.

When grease particles come into the vicinity of the rods or wires 72, they are charged to one polarity, causing them to be attracted to the interior surfaces 67a and 68a and cling thereto by electrostatic action. Thus, the electrostatic action enhances the centrifugal and impingement action as described above.

The suffixes "a" are employed relative to FIGS. 8–10 since such figures show (in addition to the electrostatic means) a curved embodiment of the filter, such as is employed in the apparatus of FIGS. 1–3. Except for the curvature, which is shown in FIG. 10, and except for the electrostatic means, the embodiment of FIGS. 8–10 is identical to that of FIGS. 5–7.

The mounting of the rods or wires may be effected either entirely from the ends thereof, especially in the case of rods, or by the spacing of insulation means along the length of the filter elements (particularly in the case of curved filters incorporating electrode wires).

Throughout the present specification and claims, the use of the word "maximum" denotes that reference is being made to the outer or peripheral regions of the vortex, as distinguished from any interior or non-peripheral region thereof. Thus, for example, with reference to double-arrow "H" in FIG. 4, this is the "maximum" diametral dimension of vortex 41e in a direction perpendicular to surface 47e, even though such "H" is not the major diameter of the modified ellipse formed by vortex liner 28e.

The foregoing detailed description is to be clearly understood as given by way of illustration and example only, the spirit and scope of this invention being limited solely by the appended claims.

I claim:

1. A grease-hood apparatus of the vortex type, which comprises:
    (a) grease-filter means adapted to have passed therethrough grease and fumes from the cooking appliance with which the grease-hood apparatus is associated, the upstream face of said grease-filter means comprising surface means which is curved,
    (b) vortex-liner means mounted adjacent said filter means and adapted to receive air and fumes deflected off said curved upstream face of said filter means and then to curve said air and fumes in a vortex,
    (c) means to pass air and fumes from the cooking appliance into the vicinity of said filter means,
    (d) means to draw air and fumes through said filter means, and
    (e) means to supply make-up air to said grease hood and to effect vortical flow in such vortex-liner means of such make-up air and of air and fumes from said cooking appliance, said vortical flow resulting not only from the shape of said vortex-liner means but also of said shape of said upstream face of said grease-filter means.

2. The invention as claimed in claim 1, in which the manner of curvature of said surface means is such that a substantially straight hypothetical horizontal line lying generally in said upstream face and moving upwardly or downwardly does not lie in a plane but instead describes a curve.

3. The invention as claimed in claim 1, in which said curved face is generally concave.

4. The invention as claimed in claim 1, in which the shape of said vortex-liner means, in vertical section, is generally circular.

5. The invention as claimed in claim 4, in which said upstream face of said filter means is generally tangential to one edge of said vortex-liner means, and in which said vortex-liner means has another edge which is spaced away from said upstream face of said filter means.

6. The invention as claimed in claim 5, in which said means to supply make-up air includes means to pass such air in a curtain below said vortex-liner means and into engagement with said upstream face, said air in said curtain entraining air and fumes from said cooking appliance, a portion of said air and fumes passing directly through said filter means, another portion of said air and fumes passing upwardly into said votrex-liner means and then vortexing back downwardly into the vicinity of said filter means.

7. A grease-hood apparatus wherein the filters may be readily installed, removed and cleaned without danger of contact with the hot cooking appliance disposed therebeneath, which comprises:
    (a) grease filter means,
    (b) housing means to define a chamber into which air and cooking fumes are adapted to be introduced, said housing means including a portion adapted to mount said grease filter means, and further including a vortex-liner means which determines, when in a predetermined position, the shape of a vortex generated in said housing means,
   at least part of said vortex-liner means being movable away from said predetermined position in order to permit easy access to said portion of said housing means at which said grease filter means are mounted, and
(c) means to generate a large-diameter vortex of air and fumes in said housing means and having a shape determined by said vortex-liner means when the same is in said predetermined position.

8. The invention as claimed in claim 7, in which said vortex-liner means has at least two parts, one of said parts being fixed, the other of said parts being movable and constituting a door through which a grease filter may be introduced or removed.

9. The invention as claimed in claim 7, in which said vortex-liner means is shaped as a substantially continuous curve and has a fixed portion relatively adjacent said portion of said housing means in which grease filters are adapted to be mounted, and has a movable portion pivotally connected to said fixed portion and adapted to be pivoted outwardly to a position permitting introduction and removal of grease filters through said vortex-liner means to said portion of said housing means.

10. The invention as claimed in claim 7, in which grease filters are mounted in said portion of said housing means.

11. The invention as claimed in claim 7, in which said housing means further comprises an outer housing having door means therein, said door means being adapted to be opened in order to provide access to said movable portion of said vortex-liner means.

12. The invention as claimed in claim 7, in which said vortex-liner means is curved in shape.

13. A vortex-type grease-hood apparatus which may be constructed with a small front-to-rear dimension, which apparatus comprises:
(a) means to define a chamber adapted to receive grease-laden air and cooking fumes from a cooking appliance,
(b) grease-filter means provided adjacent said chamber for reception of air and fumes therefrom,
(c) means to draw air and fumes from said chamber through said filter means and to deliver such air and fumes to a region exterior to the room in which said cooking appliance is disposed,
(d) means to supply make-up air to said chamber directly from a region exterior to said room,
   said make-up air-supply means being such that make-up air passes in a stream or curtain across said chamber and contacts said filter means,
   air and cooking fumes from said appliance being entrained in said make-up air stream or curtain as it thus passes across said chamber, and
(e) means to create in said chamber, and on the opposite side of said stream or curtain from the region where air and fumes from said cooking appliance enter said chamber, a vortex the maximum vertical dimension of which is at least about equal to the maximum horizontal dimension thereof,
   said vortex means receiving much of the air and fumes from said cooking appliance and whirling such air and fumes prior to passage thereof through said grease filter means,
   said vortex means including a vortex liner which is generally circular in vertical section,
   a portion of the circle being omitted in order to permit entrance of air and fumes into the vicinity of the interior surface of said vortex liner.

14. A vortex-type grease-hood apparatus which may be constructed with a small front-to-rear dimension, which apparatus comprises:
(a) means to define a chamber adapted to receive grease-laden air and cooking fumes from a cooking appliance,
(b) grease-filter means provided adjacent said chamber for reception of air and fumes therefrom,
(c) means to draw air and fumes from said chamber through said filter means and to deliver such air and fumes to a region exterior to the room in which said cooking appliance is disposed,
(d) means to supply make-up air to said chamber directly from a region exterior to said room,
   said make-up air-supply means being such that make-up air passes in a stream or curtain across said chamber and contacts said filter means,
   air and cooking fumes from said appliance being entrained in said make-up air stream or curtain as it thus passes across said chamber, and
(e) means to create in said chamber, and on the opposite side of said stream or curtain from the region where air and fumes from said cooking appliance enter said chamber, a vortex the maximum vertical dimension of which is at least about equal to the maximum horizontal dimension thereof,
   said vortex means receiving much of the air and fumes from said cooking appliance and whirling such air and fumes prior to passage thereof through said grease filter means, said vortex means including a vortex liner which is substantially continuously curved and has a vertical dimension much longer than the horizontal dimension thereof,
   a portion of said vortex liner adjacent said grease-filter means being omitted in order to permit entrance of air and fumes into the vicinity of the interior surface of said vortex liner.

15. A vortex-type grease-hood apparatus which may be constructed with a small front-to-rear dimension, which apparatus comprises:
(a) means to define a chamber adapted to receive grease-laden air and cooking fumes from a cooking appliance,
(b) grease-filter means mounted adjacent said chamber for reception of air and fumes therefrom,
   said grease-filter means having an upstream surface or face on the side of said grease-filter means adjacent said chamber,
(c) means to draw air and fumes from said chamber through said filter means and to deliver such air and fumes to a region exterior to the room in which said cooking appliance is disposed,
(d) means to supply make-up air to said chamber directly from a region exterior to said room,
   said make-up air-supply means being such that said make-up air passes in a stream or curtain across said chamber and contacts said filter means,
   air and cooking fumes from said appliance being entrained in said make-up air stream or curtain as it thus passes across said chamber, and
(e) means to create in said chamber, and on the opposite side of said stream or curtain from the region where air and fumes from said cooking appliance enter said chamber, a vortex the maximum diametral dimension of which in a direction generally parallel to said face of said filter means is at least about equal to the maximum diametral dimension thereof in a direction generally perpendicular to said face of said filter means, said vortex means receiving much of the air and fumes from said cooking appliance, and from said stream or curtain, and whirling such air and fumes prior to passage thereof through said grease-filter means, said vortex means including a vortex liner which is generally circular in vertical section, a portion of the circle being omitted in order to permit entrance of air and fumes into the vicinity of the interior surface of said vortex liner.

16. A vortex-type grease-hood apparatus which may be constructed with a small front-to-rear dimension, which apparatus comprises:

(a) means to define a chamber adapted to receive grease-laden air and cooking fumes from a cooking appliance, (b) grease-filter means mounted adjacent said chamber for reception of air and fumes therefrom, said grease-filter means having an upstream surface or face on the side of said grease-filter means adjacent said chamber, (c) means to draw air and fumes from said chamber through said filter means and to deliver such air and fumes to a region exterior to the room in which said cooking appliance is disposed, (d) means to supply make-up air to said chamber directly from a region exterior to said room, said make-up air-supply means being such that said make-up air passes in a stream or curtain across said chamber and contacts said filer means, air and cooking fumes from said appliance being entrained in said make-up air stream or curtain as it thus passes across said chamber, and (e) means to create in said chamber, and on the opposite side of said stream or curtain from the region where air and fumes from said cooking appliance enter said chamber, a vortex the maximum diametral dimension of which in a direction generally parallel to said face of said filter means is at least about equal to the maximum diametral dimension thereof in a direction generally perpendicular to said face of said filter means, said vortex means receiving much of the air and fumes from said cooking appliance, and from said stream or curtain, and whirling such air and fumes prior to passage thereof through said grease-filter means, said vortex means including a vortex liner which is substantially continuously curved, a portion of said vortex liner adjacent said grease-filter means being omitted in order to permit entrance of air and fumes into the vicinity of the interior surface of said vortex liner.

* * * * *

UNITED STATES PATENT AND TRADEMARK OFFICE
CERTIFICATE OF CORRECTION

PATENT NO. : 4,085,736
DATED : April 25, 1978
INVENTOR(S) : Irvin R. Kuechler

It is certified that error appears in the above-identified patent and that said Letters Patent are hereby corrected as shown below:

Column 1, line 46, cancel "adequate" and substitute --- inadequate ---.

Column 5, line 45, after "open" and before "bottomed" insert a hyphen (-).

Signed and Sealed this

Twenty-second Day of May 1979

[SEAL]

Attest:

RUTH C. MASON
Attesting Officer

DONALD W. BANNER
Commissioner of Patents and Trademarks